US006392758B2

United States Patent
Hines

(10) Patent No.: US 6,392,758 B2
(45) Date of Patent: May 21, 2002

(54) WAIT-BAND ALLEVIATION VIA HOST-PC BUFFERING

(75) Inventor: Steven K. Hines, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/948,186

(22) Filed: Oct. 9, 1997

(51) Int. Cl.7 .............................................. G06F 15/00
(52) U.S. Cl. ..................................... 358/1.9; 358/1.17
(58) Field of Search ................................ 395/114, 115, 395/116; 358/1.1, 1.9, 1.15, 1.16, 1.17

(56) References Cited

U.S. PATENT DOCUMENTS

| | | | |
|---|---|---|---|
| 4,942,541 A | * 7/1990 | Hoel et al. ................... | 395/115 |
| 5,047,955 A | * 9/1991 | Shope et al. ................. | 395/111 |
| 5,469,534 A | * 11/1995 | Brindle et al. ............... | 395/114 |
| 5,490,237 A | * 2/1996 | Zimmerman et al. ........ | 395/115 |
| 5,594,860 A | * 1/1997 | Gauthier ...................... | 345/501 |
| 5,604,847 A | * 2/1997 | Dennis et al. ................ | 395/116 |
| 5,644,683 A | 7/1997 | Ross et al. | |
| 5,796,930 A | * 8/1998 | Gauthier et al. ............. | 395/116 |

OTHER PUBLICATIONS

"The Experimental Migration of a Distributed Application to a Multithread Enviroment", by Thuan Q. Pham, HPL–91–155, Oct. 16, 1991, HPL Technical Reports.
Harvey M. Deitel, An Introduction to Operating Systems, Addison–Wesley, pp. 116–118, 1990.*
Hartley, The SR Programming Language Operating Systems Programming, p. 70, 1995.*

* cited by examiner

Primary Examiner—Yon J. Couso

(57) ABSTRACT

The present invention is a print system and method for providing wait-band alleviation of printers via host buffering. The print system of the present invention is embodied in a software-driven scheme with independent multithreading operations for efficiently controlling and maximizing print jobs and includes a host computer connected to a printer, an operating system functioning on the host computer, an application running on the operating system and producing an image to be printed, and a printer driver interacting with the operating system. The software-driven buffering scheme and multithreading system provides simultaneous operation of software-driven components as well as hardware, to thereby provide continuous throughput of data to the printer.

34 Claims, 9 Drawing Sheets

WAIT-BAND ALLEVIATION VIA HOST-PC BUFFERING

BACKGROUND OF THE INVENTION

1. Field of the Invention

The present invention relates in general to printing systems for computers and in particular to a print system and method for providing wait-band alleviation of printers via host computer buffering.

2. Related Art

Most, if not all, computer systems utilize printers to transform images and data residing on a host computer device, such as a personal computer, into a physical hardcopy. The printer is usually bi-directional (allows two-way communication between the host computer and the printer) and is directly connected to the host computer device via standard communication cable. The host computer device typically has an operating system for running internal software applications and managing external hardware. One piece of external hardware includes a video monitor for interfacing a user with the computer system. When a user is working with an image or data on the host, the image or data can be stored on the host as a graphical or text based file. There are many different types of graphical formats for storing the file, most of which store the file in terms of additive red, green, blue (RGB) primary colors.

Most color printers use a combination of cyan, magenta, yellow, and black (CMYK) to create a visual perception of a wide range of colors. The image stored on the host as an RGB file must be converted to the CMYK format usable by the color printer and at the resolution of the printer. This conversion is typically done by means of a printer driver, which is usually a software package (containing software-driven components) installed on the host. A particular software printer driver for a particular printer works with applications running on the host that need to print data to that particular printer. Every printer typically has its own specific printer driver, which usually contains general software-driven functions, as well. as unique software-driven functions specific only to the particular printer.

Operating systems, such as the types made by the Microsoft Corporation, Redmond, Wash., usually include a device development kit (DDK) as a resource guide for developing printer drivers to work with the operating system. One operating system made by Microsoft includes a printing system having a "Universal Printer Driver" (Unidriver) for carrying out print job requests on most types of printers. Typically, a software minidriver is developed for a particular printer to work with the Unidriver of the operating system. A printer minidriver is an executable file that provides device-driver support for a particular printer. It contains data that describes the capabilities, commands, and resident fonts of the particular printer. A printer minidriver also includes a set of required "entry points" (receiving and transmitting ports) that the operating system graphic device interface calls to retrieve information about and to send information to the particular printer.

Although the minidriver contains "entry points", it does not actually carry out the actions requested by an interface component, such as a graphic device interface (GDI). Instead, it calls the Unidriver and provides the information that the Unidriver needs to carry out the requested actions on the device (such as printing text, rendering bitmaps, or advancing a page). Specifically, the minidriver is built so that it can accept requests from the operating system GDI, and then, in most cases, pass the requests to the Unidriver along with information that describes the capabilities, commands, and resident fonts of the particular printer.

In addition, the operating system discussed above by Microsoft has a print spooler (acronym for simultaneous peripheral operations on-line) and a language monitor are utilized for enabling print jobs to be routed to local and network printers. The print spooler accepts a data stream prepared by the GDI and/or a printer driver for output on a particular type of printer. The spooler delivers data to printers for printing, either directly or by playing back spooled files. The spooler manages the events and format conversions that result in the data being output on an application-designated printer. The spooler also manages a dynamic environment made up of printers, printer drivers, print providers, monitors, ports, and print jobs. The spooler maintains a registry of information to derive the number of components that are in the printer subsystem at any time and the unique name of each component. The spooler also keeps track of the current status of each component.

The language monitor normally configures a printer and monitors printer status for providing two-way communication between the computer and a bi-directional printer. Also, the language monitor can be used to add data, such as printer control information, to the print stream going to the printer. The language monitor is printer description language-specific. As such, each bi-directional printer has a specific language monitor developed for that particular printer. The language monitor is typically a software package having software-driven components, and can be comprised of one or several dynamic link library (DLL) files.

For example, code running on the host computer can request configuration and status information from the printer, and/or the printer can send unsolicited status information to the computer whenever certain events occur on the printer. The language monitor can also be used to add data, such as printer control information, to a data print stream sent to the printer. Generally, the language monitor implements all the bi-directional communication functionality between the host and printer, such as translating requests from the computer and either solicited or unsolicited responses from the printer.

Microsoft's DDK illustrates a sample printer driver interacting with the language monitor and the spooler for a typical print sequence operating on the operating system discussed above. First, a printer driver requests instructions on how to render a print job on an associated printer and returns to the instructions on rendering the print job on the printer. Second, if the print job is not direct, the print job is spooled to the disk as a raw-format spool file. Each piece of the print job is appended to the spool file until the application signals that the job is complete. These steps are repeated many times to build a complete spool file. It should be noted that a direct print job occurs when a print job, which already has been spooled, is sent again as another print job. A direct print job goes directly to the printer instead of being rewritten as another spool file.

Next, a main thread is started that determines the best time to start playing back the spooled file to the printer. A thread is an executable command that can execute commands independently of other operations and commands. At the determined best time, the main thread makes a call to the language monitor to start a new playback thread to playback the spooled file. Because the started thread is a new thread, the thread: 1) invokes a function to read part of the spooled file off the disk; and 2) invokes the language monitor with a write function to send the data through the physical port connected to the bi-directional printer. Note that the playback thread steps are repeated until the end-of-file is reached on the spooled file (or the print job is canceled). After an end-of-file is reached (or a cancellation of the print job) the playback thread is terminated.

Although the printer can typically begin printing after receiving data from the language monitor, the data may be delayed due to various factors. For example, the complexity of the image may cause delays in the language monitor and/or spooler, which will cause delays in the overall print process. This is because whenever the spooler generates data and calls the driver, the spooler is not sending data to the language monitor. Also, whenever the language monitor processes and sends data to the printer, the spooler is not generating or sending data to the language monitor.

Specifically, after generation of data, such as a first band of data (a band of data is usually an arbitrary packet of print data containing information about the print job which can vary in size from several kilobytes to several megabytes), the spooler sends that first band of data to the language monitor. The language monitor processes the first band of data and sends the first band of data to the printer. However, no data, such as a second band of data, is generated and sent by the spooler to the language monitor during the processing and transmission of the data by the language monitor. This is because, according to the above architecture, the language monitor is busy processing the first band of data. In other words, the second band of data is not generated and sent to the language monitor until the first band of data is completely processed and transmitted by the language monitor. This means that the spooler is inactive for a period of time just after a band of data is generated and sent to the language monitor. Therefore, the spooler is not continuously operating, which creates delays and down time in the print process.

Consequently, if a print job is complex, the printer and language monitor are inactive while the spooler generates and sends data. Similarly, if after receiving the first band of data the printer's memory becomes full (additional print data cannot be received by the printer) or ink has not dried yet, both the language monitor and the spooler must wait until more printer memory becomes available or until the ink has dried. This results in undesirable burst transfers, a phenomenon typically referred to in the art as wait-banding.

Wait-banding can occur as follows: a first band of data is generated; the first band of data is received by the printer (all memory is used); then the printer prints while the spooler and language monitor wait until more printer memory is available. After the spooler generates the first band of data, it has to wait for the language monitor to process and send the data and for the printer to print the data. After the printer is done with the first band of data, it returns to the spooler which spends, for example, 30 seconds generating a new band of data. That 30 seconds corresponds to a single wait-band.

One method of alleviating wait-banding includes using a printer heater. A printer heater provides faster printer ink drying time. However, it only addresses one cause of wait-banding, namely, ink drying times. Also, since a printer heater is expensive, it adds excessive production costs to the product. Another method of alleviating wait-banding includes adding more printer memory. Although additional printer memory allows more print data to be received by the printer, this later method addresses only one cause of wait-banding, namely limited printer memory. Also, since printer memory is expensive, it adds excessive production costs to the produce.

Several other methods of alleviating wait-banding include modifying the print media or the ink of the printer. Some types of printer paper and printer inks provide faster ink drying time. However, these modifications to the print media and the printer ink do not solve the computer/printer communication problem (direct cause of wait-banding) directly, but instead provide an indirect "quick fix" solution. Also, print media and printer ink are always in flux and changing, hence they are not a stable solution. In addition, since these methods involve external hardware modifications, they can be expensive.

One direct approach to alleviating wait-banding is with software control. This is accomplished by establishing a fixed delay with software control between each print pass. By the time the passes are complete, the printer has more page sector information available for printing. However, this approach disadvantageously increases the overall time needed to print any given page, even though page sector information is ready in advance of when the passes are made. In other words, this method unnecessarily decreases the throughput of the printer, which is a very important factor.

Therefore, what is needed is a direct solution to printer wait-banding which does not sacrifice printer throughput. What is also needed is an inexpensive solution to printer wait-banding. What is additionally needed is a stable solution to printer wait-banding. What is further needed is a printing system that allows data to be continuously generated and simultaneously sent while new data is generated.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a print system and method for providing wait-band alleviation of printers via host computer buffering. The print system of the present invention is embodied in a universal software-driven scheme with independent multithreading operations for efficiently controlling and maximizing print job performance.

The print system of the present invention includes a host computer connected to a printer, an operating system functioning on the host computer, an application running on the operating system and producing an image to be printed, and a printer driver interacting with the operating system for translating print data to a form readable by the printer. In addition, other components interact with the application and printer driver. Namely, the print system of the present invention further includes a spooler for generating and transmitting print data, a universal printer monitoring device, such as a language monitor, for processing and transmitting printer data to the printer and for providing two-way communication with the printer, and a status monitor for providing print status information and for canceling print jobs.

The universal software-driven buffering scheme and multithreading system of the present invention allows continuous throughput of data to the printer. For example, a first band of data is generated and a first thread (an execution of operation) is started to send and store the first band of data in the language monitor. Next, a second thread is started for processing the first band of data and sending from the language monitor to the printer. While the second thread processes the first band of data (immediately after the first thread sends the first band of data to the language monitor for storage), the first thread calls the spooler to generate and send a second band of data. Thus, the spooler operates at the same time the language monitor and the printer are performing operations. As a result, simultaneous operation is achieved to thereby alleviate wait-banding and to increase the overall throughput of the printer. In addition, the language monitor of the present invention has the ability to wait before sending print data to the printer. For some print jobs, wait-banding can be reduced if the print job is not started until the operating system generates several blocks of data for the printer. In these cases, the language monitor is capable of waiting an appropriate time before sending the print data to the printer.

A feature of the present invention is the universal capabilities of the software-driven buffering scheme and its adaptability to efficiently work with many printers and host computer systems. Another feature of the present invention is multithreading, which allows data to be continuously generated and sent while new data is generated simultaneously, thereby increasing printer throughput. An advantage of the present invention is that it is a direct solution to printer wait-banding without sacrificing printer throughput. Another advantage of the present invention is that it is inexpensive. Yet another advantage of the present invention is that it is universal and configurable for use with many printers. Therefore, the present invention has practical applications and tremendous real world value in the highly competitive computer/printer market.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Structural Overview

Figure 1:
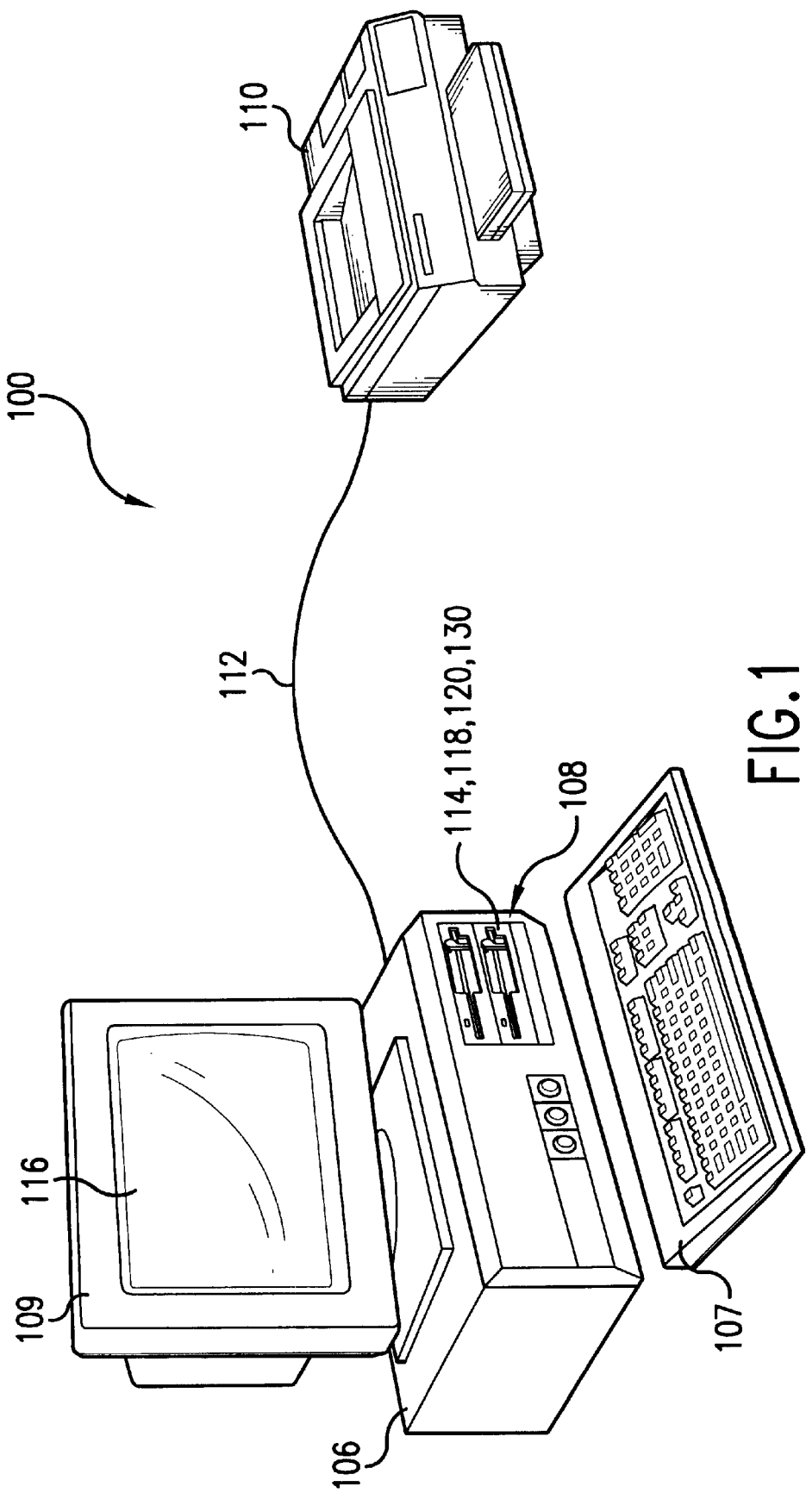
FIG. 1 is an overview structural block diagram of the present invention.
Figure 2:
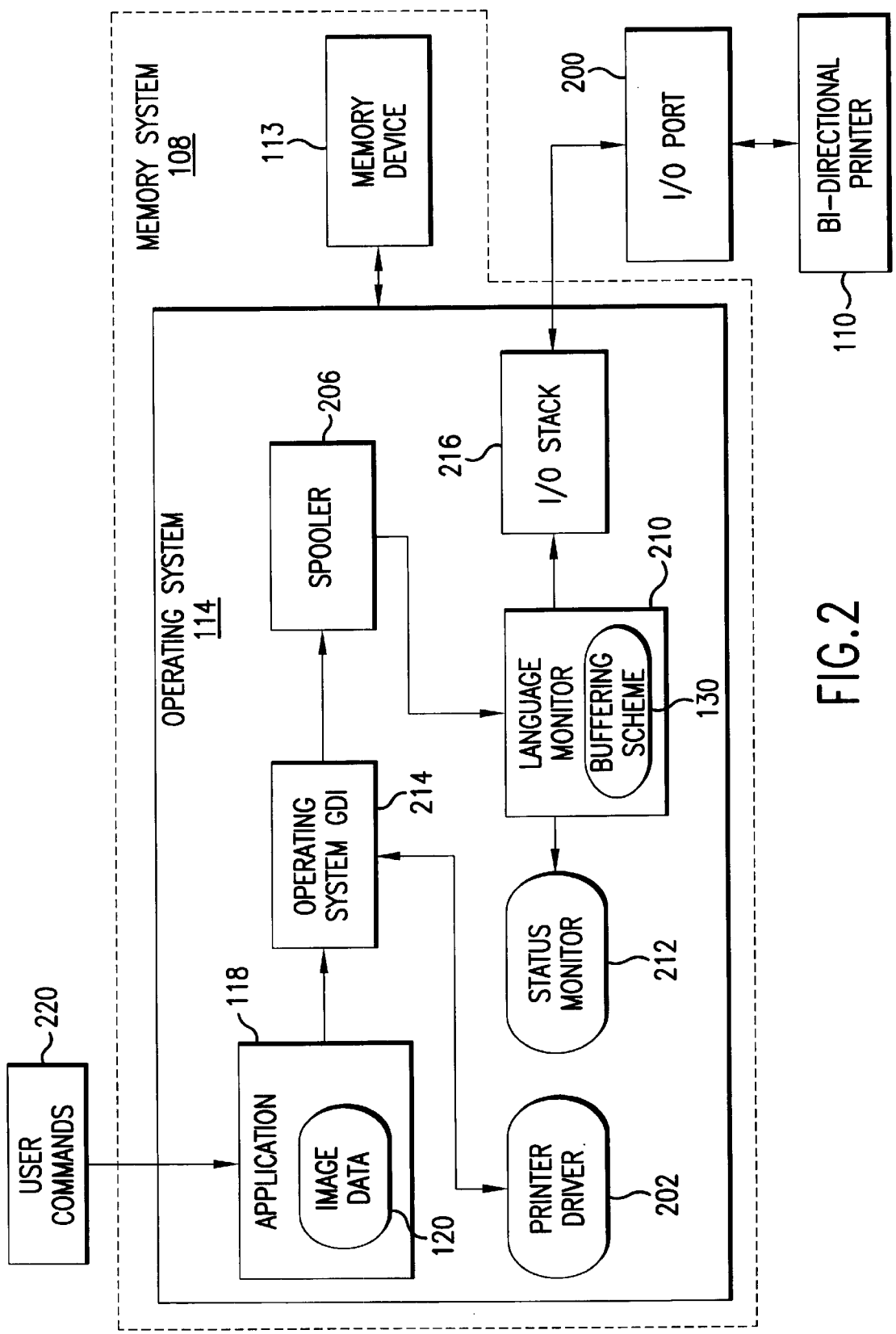
FIG. 2 is an overview block diagram of the present invention.

Referring now to the drawings and more particularly to FIGS. 1–2, there is shown a printer multi-thread language monitor system 100, which is constructed in accordance with the present invention. The system 100 enables a software language monitor 210 of a host operating system 114, to buffer textual and graphic information processed by a personal computer 106 to a local printer 110 without inherent delays associated with wait-banding. More particularly, the system 100 allows the operating system 114 to continuously generate, process and send blocks of information to the printer 110 in a fast and efficient manner to substantially increase total printer throughput.

The print system 100 of the present invention includes a standard host computer 106, such as a personal computer (PC) connected to a printer 110, such as a bi-directional printer, via a standard printer cable 112, such as IEEE 1284 compliant parallel printer cable. The host computer 106 has an input device 107, a screen display 109 and a computer readable memory system 108 comprised of memory devices having computer readable mediums, such as a hard drive (removable or fixed), and/or random access memory (RAM), and/or resident secondary RAM cache, etc. for storing software-driven components and for buffering digital information (providing random access to stored digital data), such as providing a virtual memory device.

Also included is a software-driven operating system 114, which can be one of the operating systems produced by Microsoft Corporation, Redmond, Wash. The operating system 114 operates on the host computer 106 and executes a software-driven application 118 to generate a graphical user interface (GUI) 116 on the screen display 109. The application 118 produces image data 120 to be printed. The application 118 can be any standard software-driven application running on the operating system 114. The operating system 114, application 118 and image data 120 preferably reside on one of the devices of the memory system 108 of the host computer 106 and interact with at least one of the memory devices 113 (which can be the same device they reside on) of the host computer 106. The input device, such as a keyboard 107, and/or a mouse (not shown), and/or a trackball (not shown), etc. can be used to allow a user to interface with and input user commands to the system 100. Although the host computer 106 is preferably a PC, other types of computers and workstations running other operating systems or the like may be employed.

FIG. 2 is an overview block diagram of an application software component running on the operating system of the host computer of the present invention. A software-driven buffering scheme 130 (discussed in detail below and in FIGS. 3–5) of the language monitor 210 preferably resides on one of the devices of the memory system 108 of the host computer 106 and utilizes at least one of the memory devices 113 (which can be the same device it resides on) for efficiently controlling and maximizing print job performance while interacting with the operating system 114. It should be noted that all software-driven components of the present invention are preferably stored on a portion or specific device of the memory system 108 of the host computer 106. The software-driven components preferably utilize the memory devices 113, which can be the hard drive, and/or the RAM and/or any other suitable storage device during operation of the respective software-driven components. The memory device 113 is available to the operating system 114 and components running on the operating system 114 for caching and buffering digital data. An input/output hardware port (I/O port) 200 is included for physically coupling the host computer 106 to the printer 110 via the printer cable 112.

In order for the textual and graphic information generated by the computer 106 to be formatted and assembled for use by the printer 110, the print system 100 includes a printer driver software component 202. The printer driver 202 preferably resides on one of the devices of the memory system 108 of the host computer 106 and cooperates with the operating system 114 to convert the image data 120 processed by the computer 106 to a format usable by the printer 110. This process of a conversion is well known to those skilled in the art and will not be described hereinafter in greater detail. The printer driver software component 202 is preferably a software package, which can be one of the many printer driver software packages produced by the Hewlett-Packard company for use with a particular printer. The printer driver 202 communicates with a particular application 118 hat needs to print the image data 120 to a particular printer. The application 118 has a graphical user interface (GUI) to allow a user to interact with the application 118. The printer driver 202 acts like a translator between the printer 110 and applications 118 that use the printer 110. The printer driver 202 can contain general software-driven functions, as well as unique software-driven functions. The printer driver 202 is operation specific to a particular printer that is to be used with the present invention. In other words, every printer has its own set of specialized commands that only its printer driver knows. In contrast, most applications generate generic commands when an image needs to be printed. The printer driver, accepts the generic commands from the application and then translates the generic commands into specialized commands for the printer. Therefore, the type of printer used with the present invention will determine the specific printer driver used. Any specific printer driver can be used with the present invention as long as the buffering scheme and multithreading system described below is utilized.

In addition, other software components interact with the application component 118 and the printer driver component 202. Namely, the print system 100 further includes a spooler software component 206 for generating and transmitting print data, a printer monitoring device 210 (discussed in detail below and in FIGS. 3–5), such as a language monitor software component, for managing, processing, and transmitting printer data, and a status monitor software component 212 for providing printer status information, such as alerting the user that an open door exists, a paper jam exists, or the printer is out of paper. Also, the status monitor 212 preferably includes a graphic user interface (GUI) to allow the user to cancel print jobs directly from the status monitor 212. Although the status monitor 212 has general operations, each printer has its own status monitor with printer specific language.

The spooler software component 206 is preferably a standard software-driven print spooler, such as a print spooler utilized by the operating systems made by the Microsoft Corporation. Also, the status monitor software component 212 is preferably a standard software-driven status monitor, which can be the status monitor used for many of the printers made by the Hewlett-Packard company. In addition, other standard software components of the present invention include a graphic device interface (GDI) 214 for interfacing the printer driver 202 with the spooler 206 and an input/output stack (I/O stack) 216 for coupling the software components to the I/O port 200. The I/O stack 216 can be any standard I/O stack with input and output layers and communication protocols, such as the I/O stack used for many of the printers made by the Hewlett-Packard company.

Operation

Referring to FIGS. 1–2, there is shown a buffering scheme 130 interacting with a language monitor 210 for printing image data 120 of an application 118 on the printer 110, which is constructed in accordance with the present invention. The language monitor 210 translates the image data into printer 110 readable data and provides two-way communication with the printer 110. The buffering scheme 130 enables continuous throughput of the image data 120 to the printer 110 by utilizing software-driven executable devices with multiple operation executions. An execution of operation is hereinafter referred to as a thread and multiple operation executions are hereinafter referred to as multithreads. A first executable device continuously retrieves and stores portions of the image data 120. A second executable device continuously processes the stored portions of the image data 120 and continuously sends the processed portions of the image data 120 to the printer 110 via the language monitor 210. The buffering scheme 130 is implemented so that the first executable device and the second executable device operate simultaneously.

Specific operation of the present invention will now be described with reference to FIG. 2. First a user, via user commands 220, prompts the application 118 to print the image data 120. Second, the application 118 calls the GDI 214 with a print request (print job) to print the image data 120 on the printer 110. Third, the GDI 214 calls the printer driver 202 with a request for instructions on how to render the image 120 on the printer 110. Fourth, the printer driver 202 returns instructions to the GDI 214 on rendering the image 120 on the printer 110. Fifth, the GDI 214 makes an interprocess call to initiate the spooler 206.

The spooler 206 is coupled to the language monitor 210, which is coupled to the printer 110 via the I/O stack 216 and the I/O port 200. During interaction between the spooler 206 and the language monitor 210 (discussed in detail below and in FIGS. 3–5), print data is generated by the spooler 206 and then sent to the language monitor 210. The language monitor 210 processes and sends the data to the printer 110 via the I/O stack 216 and the I/O port 200. The printer 110 then prints the image data 120.

Specific Component Interaction

Figure 3:
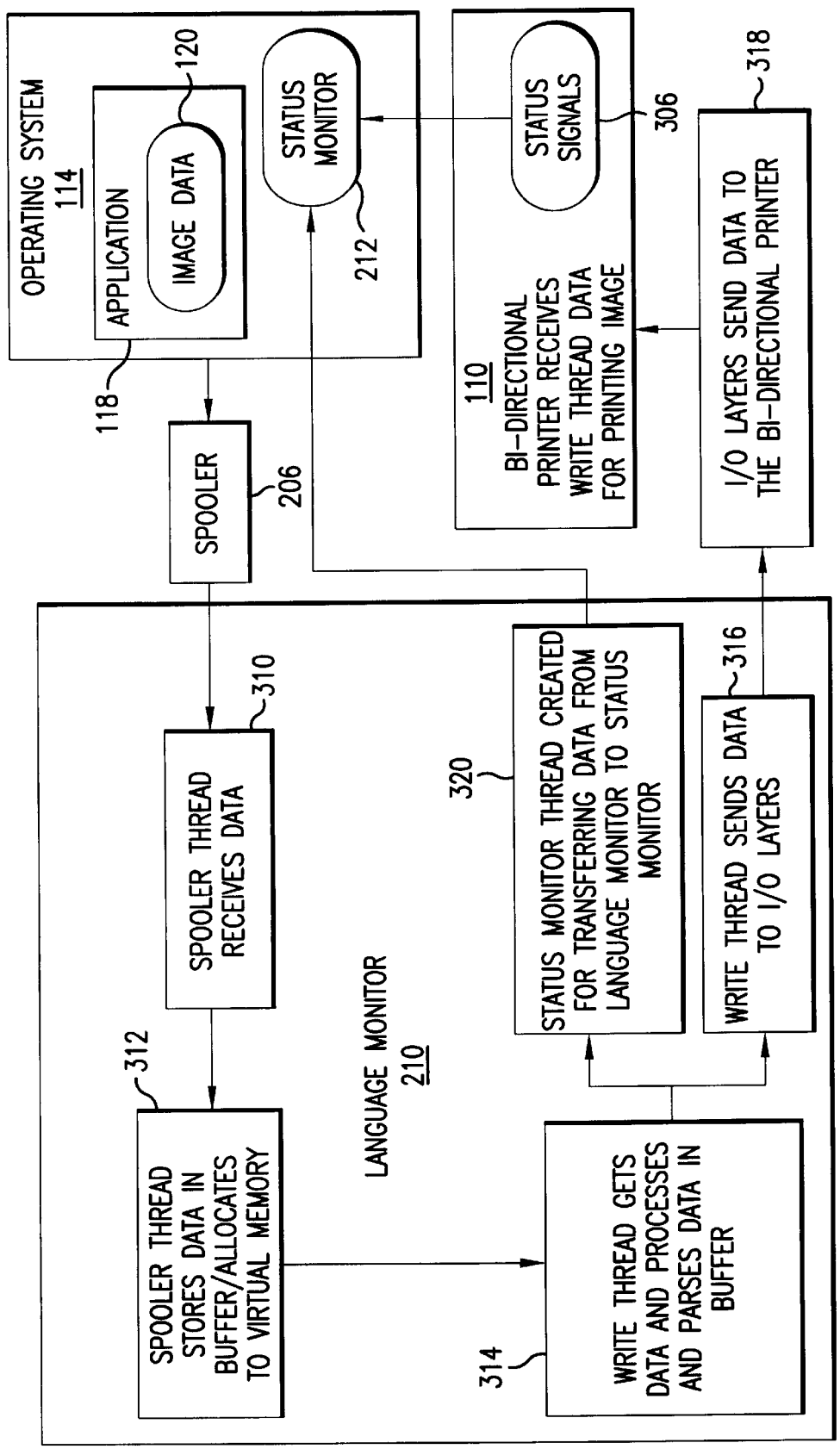
FIG. 3 is a block diagram which illustrates the interactive steps between the operating system and the language monitor of FIG. 2.
Figure 4:
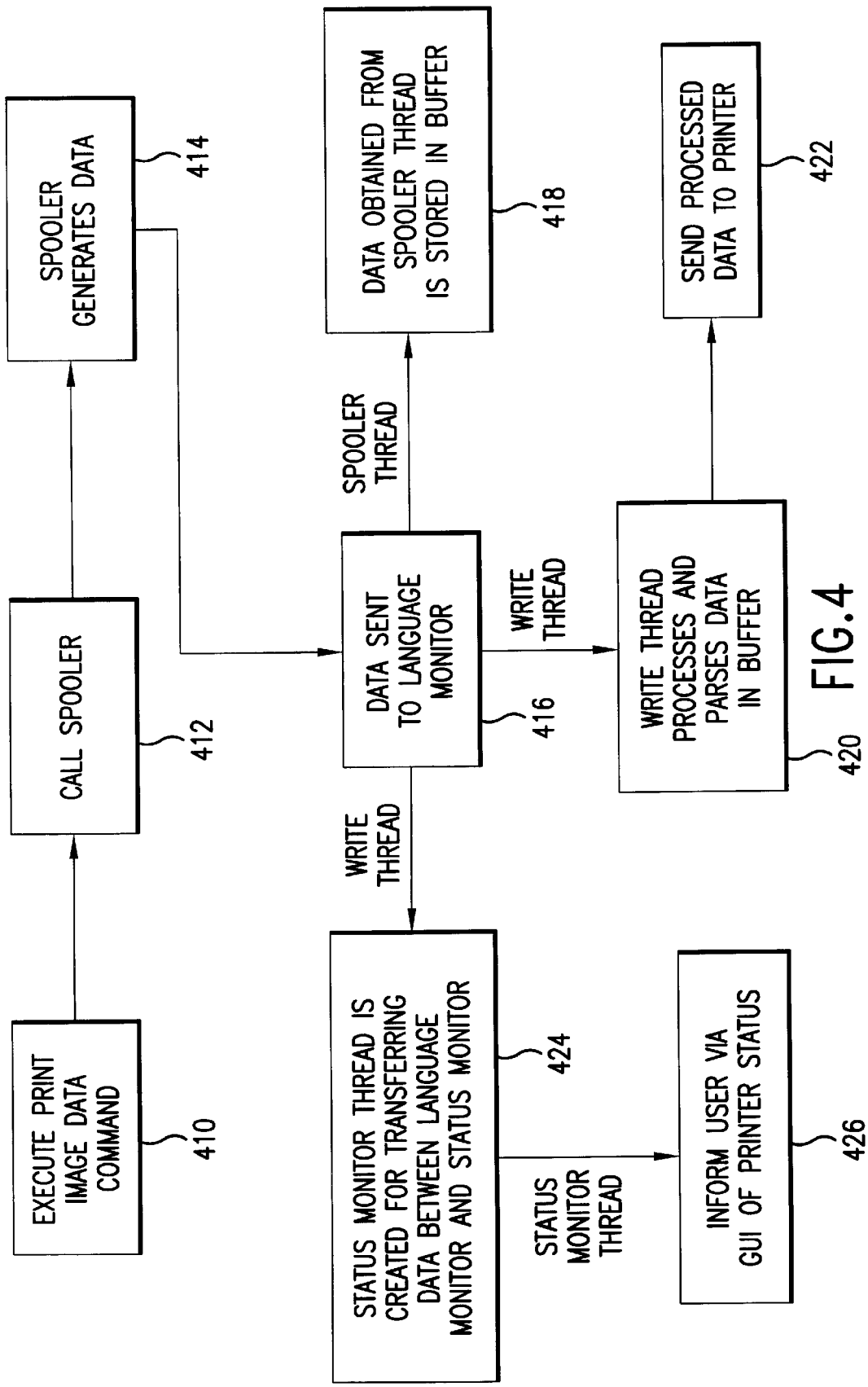
FIG. 4 is a detailed flow diagram of the multithreading operation of the present invention.

FIG. 3 is a block diagram which illustrates the interactive steps between the operating system and the language monitor of FIG. 2. FIG. 4 is a detailed flow diagram of the multithreading operations of the present invention. Referring to FIGS. 1 and 2 along with FIGS. 3 and 4, the language monitor 210 is a unique software-driven component, such as dynamic link library (DLL) file. A DLL is a library of executable functions or data that can be used by an application. A DLL provides one or more particular functions and other software-driven components can access the functions by creating either a static or dynamic link to the DLL. A static link remains constant during program execution while a dynamic link is created as needed.

The language monitor 210 of the present invention provides two-way communication between the host computer and the bi-directional printer 110. This two-way communication allows the host computer 106 to receive either solicited or unsolicited responses from the printer 110, such as configuring printer settings and monitoring the status of the printer 110. The host computer 106 can request the configuration and status information from the printer 110 and/or the printer 110 can send unsolicited status information in the form of status signals 306 to the host computer 106 when appropriate.

In addition to the above described functions, the language monitor 210 of the present invention includes a unique multithreading system and buffering scheme 130 of FIGS. 1 and 2. The multithreading system and buffering scheme 130 of the present invention is a universal system that operates integrally with the language monitor and can also be incorporated to work with any specific printer driver. The unique multithreading system is integrated with a unique software-driven buffering scheme 130 that allows continuous throughput of data to the printer 110. A sample buffering scheme 130 is discussed in detail in FIGS. 6–9 below. Also, all of the executions (threads) of the multithreading system of the present invention run simultaneously without interfering with each other.

The system of the present invention is universal and adaptable to any printer/computer system. Each system will include a specific language monitor package, for example, as specific software-driven DLL components, must be configured for each distinct printer. This is because each distinct printer includes its own specific printer language. Thus, although the buffering scheme 130 and multithreading system of the present invention are universal, each distinct printer used with the present invention must have a unique language monitor package containing the particular printer's own description language.

The multithreading system of the present invention is efficient and provides robust data management. As discussed above and with reference to FIGS. 3 and 4, after a print data command is executed (box 410 of FIG. 4) by the application 118 to print the image data 120, the spooler 206 is called (box 412 of FIG. 4) to generate print data (box 414 of FIG. 4) and send data (box 416 of FIG. 4) to the language monitor 210. Next, the multithreading buffering scheme 130 is implemented as follows: A first thread (a first execution of operation), such as a spooler thread of the language monitor 210 is started. The spooler thread retrieves (box 310 of FIG. 3) the data generated by the spooler 206 by obtaining a first band of print data. of the image 120. Each band of data is preferably an arbitrary packet of data which varies in size from several kilobytes to several megabytes. After receiving the first band of print data, the language monitor 210 immediately allocates (box 312 of FIG. 3 and box 418 of FIG. 4) the data to virtual memory of the host computer 106 (i.e., stores the first band of print data in a buffer—a special temporary storage area in memory where a device can access the data when it is ready, such as a buffer zone located on the hard disk memory device 113). Since the first band of data is immediately allocated by the spooler thread, the spooler 206 is immediately notified by the spooler thread that the language monitor 210 is ready to receive more data.

Immediately after the spooler thread stores the first band of print data in the buffer, a second thread (a second execution of operation), such as a write thread, is started for retrieving the first band of print data from the buffer and for processing the data. The write thread parses and processes the data (box 314 of FIG. 3 and box 420 of FIG. 4) in a conventional manner suitable to allow proper readability of the data to appropriate hardware. For example, the write thread parses the print rows and the data stream and identifies keys and printer escape sequences, and reforms the data. The write thread also sends the processed print data to the I/O stack (layers) (box 316 of FIG. 3). The I/O stack sends the print data to the printer 110 (box 318 of FIG. 3 and box 422 of FIG. 4).

The multithreading system and buffering scheme 130 of the present invention allows the language monitor 210 to continuously accept data from the spooler 206, which prevents substantial "down time" of the spooler 206. This is because the first band of print data is sent to the buffer immediately after the language monitor 210 receives the data. Since the spooler 206 is notified that the language monitor 210 is available for additional data, the spooler 206 continues to operate and send data to the language monitor 210 without having to "wait" for other components or devices.

Also, while the write thread processes data in the buffer, the spooler 206 continues to generate and send the data and the spooler thread continues to receive and store the data. As a result, while the spooler thread is receiving additional data from the spooler 206, the write thread continues executing. The process is repeated until all bands of print data are generated and processed. Thus, after the initial starting of the write thread for the first band of data, the write thread operates simultaneously with, but independently from, the spooler thread for subsequent bands of data. This simultaneous, yet independent, operation allows continuous activity of the spooler 206 and the spooler thread and the write thread of the language monitor 210. This continuous activity of the components alleviates wait-banding and increases the overall throughput of the printer 110.

In addition, a third thread (status monitor thread) is started by the write thread for transferring data from the language monitor 210 to the status monitor 212 (box 320 of FIG. 3 and box 424 of FIG. 4). The status monitor 212 operates separately from the spooler 206 and requests data from the language monitor 210. The status monitor 212 receives the data and informs the user, preferably via a graphical user interface, of the status of the print job (box 426 of FIG. 4). The write thread parses the print rows and the data stream and searches for commands and printer escape sequences, and reforms the data and then sends the reformed print data to the status monitor 212. For example, one of the commands can be a "paper pick command" for the printer. The write thread uses the "paper pick command" to start the status monitor thread for transferring data. The data would include information to generate a thumbnail picture of the image to be printed, page progress information, print process information and page information.

The status monitor 212 preferably only receives data from the language monitor 210 and does not send data to the language monitor 210. However, in exceptional cases, for example, if the user desires to cancel the print job directly from the status monitor 212, the status monitor 212 transmits data to the language monitor 210 to cancel the print job. The status thread provides print parameter data, such as the size of the paper to be printed on, type of paper to be printed on, row print data information, etc.

Further, the buffering scheme 130 and multithreading system can handle complex print jobs. As one example, the language monitor of the present invention has the ability to wait before sending print data to the printer. For some print jobs, wait-banding can be reduced if the print job is not started until the operating system generates several blocks (such as two blocks) of data for the printer. In these cases, the language monitor recognizes this type of print job and waits an appropriate time before sending the print data to the printer. As another example, for complex print jobs having large amounts of data, as much as an entire page of data can be stored in memory by the print system of tie present invention. This is the case when some bands of data take longer for drivers to process than others. Typically, in current systems, one band is buffered in advance; however, if a complex page is sent as a print job, and only one band is buffered, wait-banding can occur. In contrast, the present invention recognizes this type of print job and alleviates wait-banding by buffering as many bands of data as possible and waiting before sending the print data to the printer. Hence, if a complex print job with a large amount of data is sent, enough bands have already been buffered so the system will not stop and no wait-banding occurs.

An advantage of storing an entire page of data is that reprints of that particular page can be printed without taking additional memory. For example, if an application needs to generate multiple copies of an image, instead of using additional memory for the multiple copies, only one page of memory is needed and the language monitor simple replays the original page buffered into memory as multiple page prints.

Functional Relations of a Universal Working Example

Figure 5:
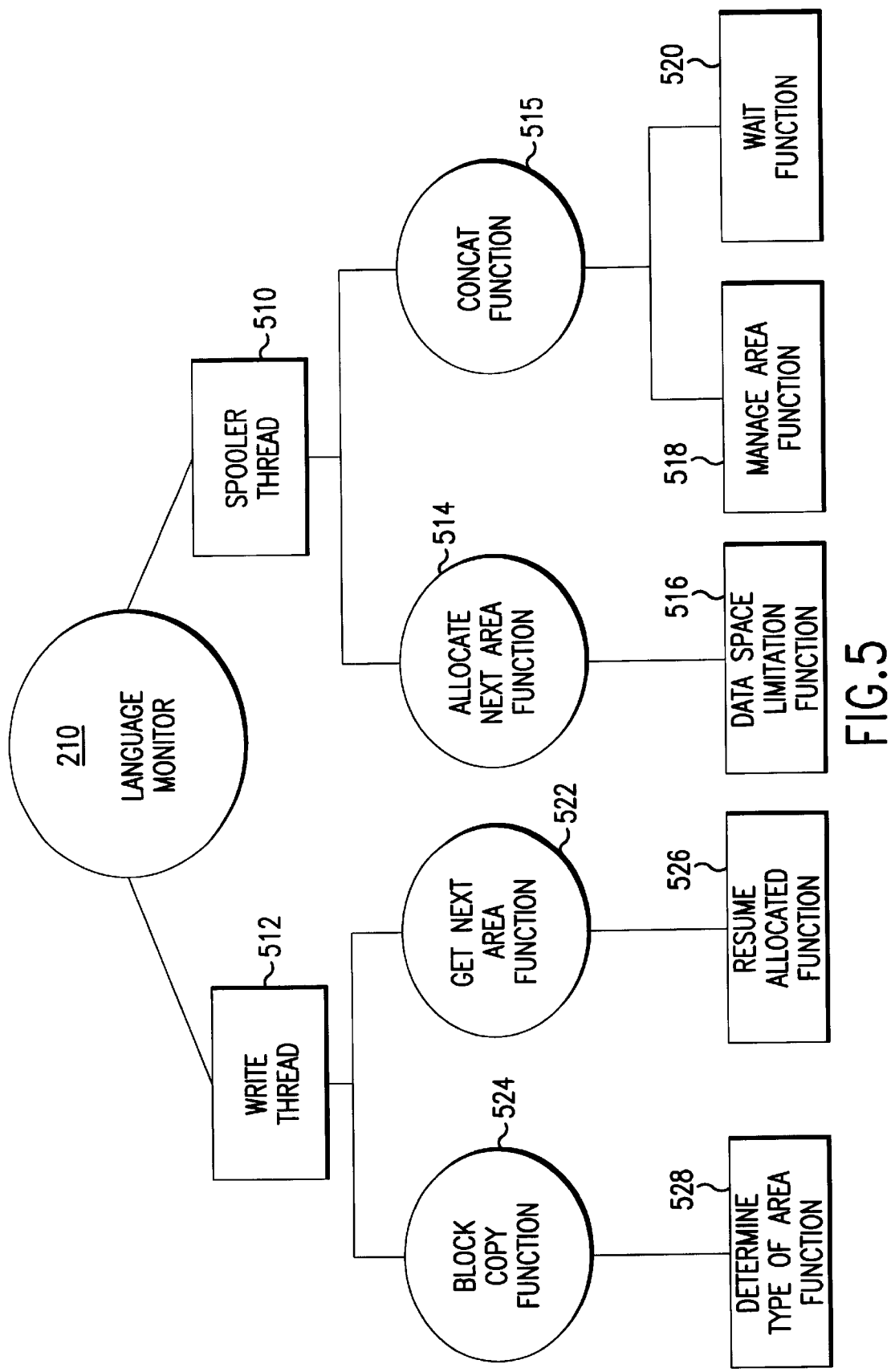
FIG. 5 is a functional/relational block diagram of the buffering scheme of the present invention.

FIG. 5 is a functional/relational block diagram of a sample buffering scheme of the present inventin. Referring the FIGS. 1 and 2 along with FIG. 5, the language monitor 210 includes two main independent threads discussed above, namely the spooler thread 510 and the write thread 512. The spooler thread 510 contains two main functions, the "allocate next area" function 514 and the "concat" function 515. The write thread 512 contains two main functions, the "get next area" function 522 and the "block copy" function 524.

FIGS. 6–9 are flow diagrams of the details of the working example of FIG. 5. The description below corresponds to FIGS. 6–9 and contains the general functions and respective subfunctions, as well as relational associations of the language monitor and the sample multithreading system and buffering scheme of the present invention. The working example described below is universal and can be used with any printer. For instance, the working example described below was successfully implemented and configured with printers made by the Hewlett-Packard company.

Description of the Universal Working Example

Spooler Thread

The spooler thread 510 contains two main functions, the "allocate next area" function 514 for allocating virtual memory for the print data and the "concat" function 515 for coordinating print data (as shown in FIG. 5). The "allocate next area" function 514 includes one subfunction, the "data space limitation" function 516. This subfunction manages the allocation of the print data when memory usage area is exceeded (for example, a buffer or cache area of the memory device 113 of FIG. 2 is full) and coordinates data when the write thread 512 is waiting for the spooler thread 510. As employed herein, the term "area" refers to an area in memory.

Figure 6:
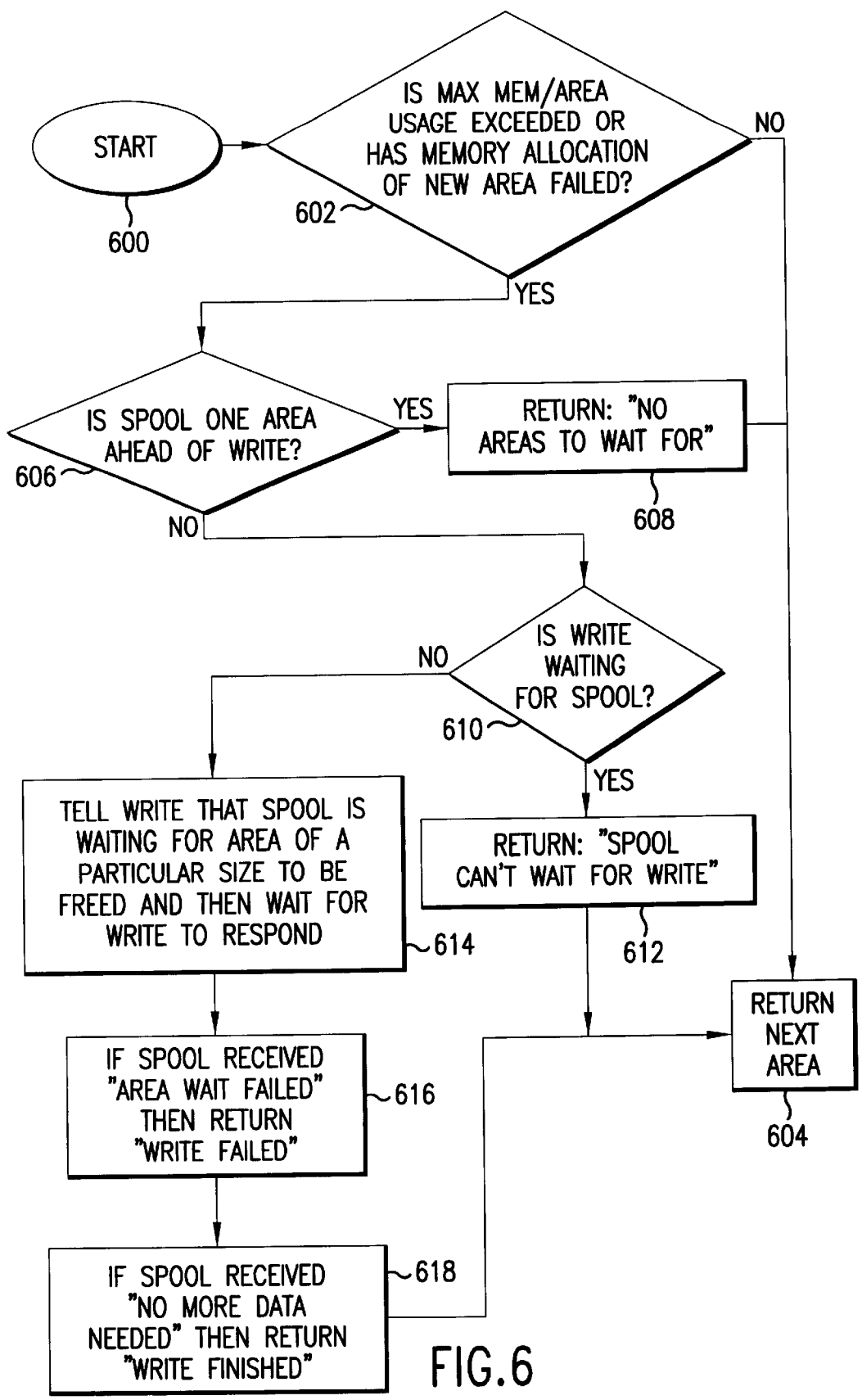
FIG. 6 is a detailed flow diagram of the operation of the "allocate next area" function of the buffering scheme of the present invention.

FIG. 6 is a detailed flow diagram of the operation of the "allocate next area" function of the buffering scheme 130 of FIGS. 1 and 2 of the present invention. The function starts (box 600) by first determining whether a total amount of memory used by all the areas exceeds a preset maximum or if the memory allocation of a new area has failed (decision box 602). If a total amount of memory is not used, the function returns to the next area (box 604). If a total amount of memory is used, the function determines whether the spooler thread is processing one area ahead of the write thread (decision box 606). If the spooler thread is processing one area ahead of the write thread, the function returns: "no areas to wait for" (box 608) and then returns to the next area (box 604). If the spooler thread is not processing one area ahead of the write thread, the function determines whether the write thread is waiting for the spooler thread (decision box 610). If the write thread is waiting for the spooler thread, the function returns" "spool thread can't wait for write thread" (box 612), and then returns to the next area (box 604). If the write thread is not waiting for the spooler thread, the write thread is informed that the spooler thread is waiting for an area of a particular size to be freed and then waits for the write thread to respond (box 614). If the spooler thread receives an "area wait failed" response the function returns "write failed" (box 616). If the spooler thread receives a "no more data needed" response the function returns "write finished" (box 618). The function will then return to the next area (box 604).

Figure 7:
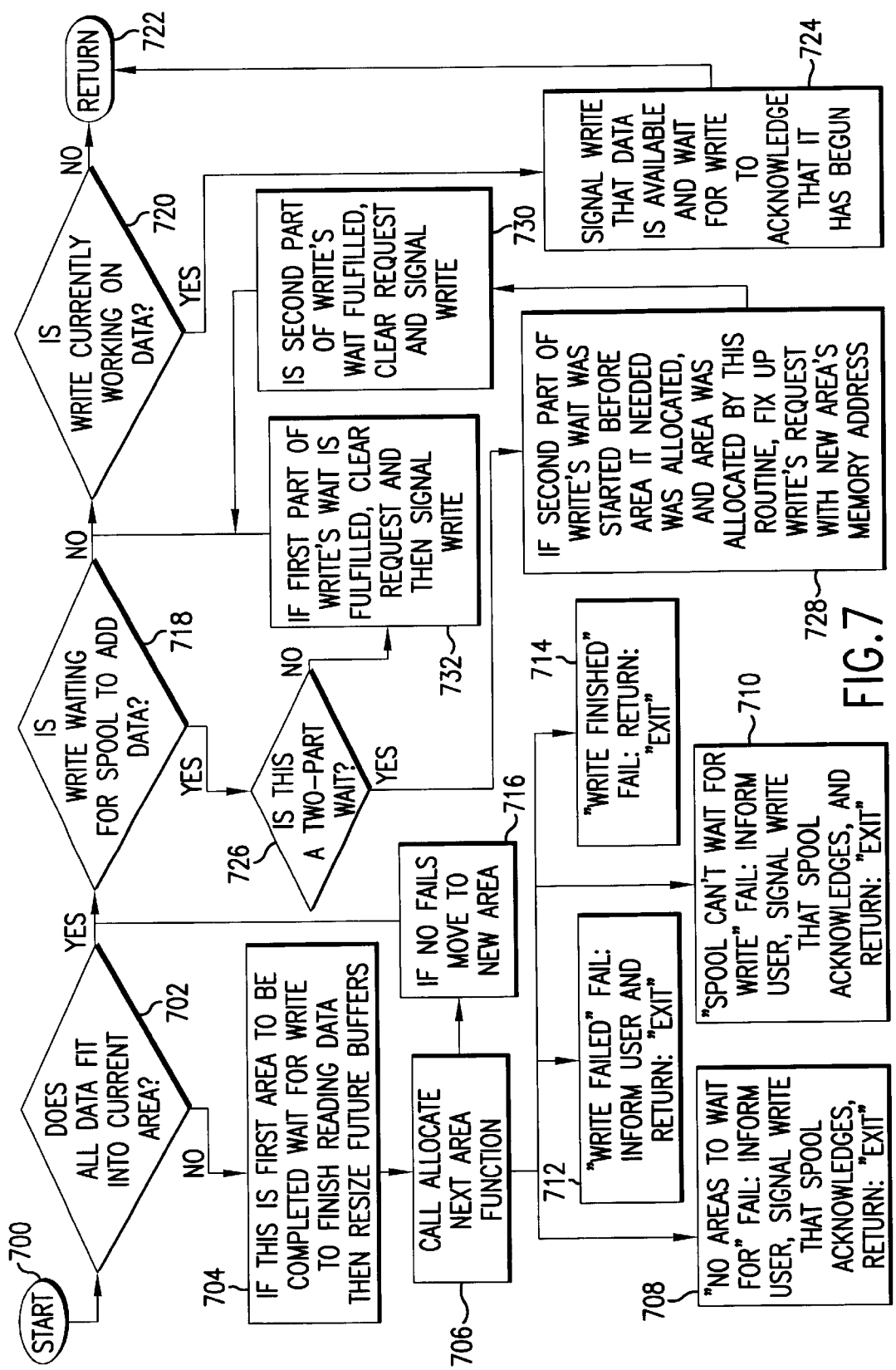
FIG. 7 is a detailed flow diagram of the operation of the "concat" function of the buffering scheme of the present invention.

FIG. 7 is a detailed flow diagram of the operation of the "concat" function of the buffering scheme 130 of FIGS. 1 and 2 of the present invention. The "concat" function 515 includes two subfunctions, the "manage area" function 518 and the "wait" function 520 (as shown in FIG. 5). The "manage area" function 518 manages a current area of the buffer if the data does not fit within that area. The function starts (box 700) by using the "manage area" subfunction 518 to first determine whether all data fits into a current area (decision box 702). If all data does not fit into a current area, and if this is the first area to be completed/filled, the function waits for the write thread to finish reading the data and then resizes future buffers (to a size indicated by the write thread) (box 704). The function then makes a call to the "allocate next area" function 514 of the spooler thread discussed above (box 706). Several responses occur from this call. If the "allocate next area" function 514 fails on "no areas to wait for" (box 708) or "spool can't wait for write" (box 710) the user is informed, a signal is sent to the write thread that the spooler thread acknowledges the fail, and the function returns "exit". If the "allocate next area" function 514 fails on "write failed" (box 712) the user is informed and the function returns "exit". If the "allocate next area" function 514 fails on "write finished" (box 714) the function returns "exit". If the "allocate next area" function 514 does not return any fails, the function moves to a new area (box 716).

The "wait" subfunction 520 has several subroutines for coordinating data if the write thread is waiting for the spooler thread to add data. If all the data fits into a current area, the function determines whether the write thread is waiting for the spooler thread to add data (see above functions) (decision box 718). If the write thread is not waiting for the spooler thread to add data, the function determines whether the write thread is currently working on the data (box 720). If the write thread is currently not working on the data, the function returns (box 722). If the write thread is currently working on the data, a signal is sent to the write thread informing it that the data is available (box 724). The function then waits for the write thread to acknowledge that it has begun working and then the function returns (box 724). If the write thread is waiting for the spooler thread to add data, the function determines whether the wait is a two-part wait (spans two areas) (decision box 726). If the wait is a two-part wait, if the second part of the write thread's wait was started before the area it needed was allocated, and that area was just allocated by this routine, the function fixes up the write thread's request with the new area's memory address (box 728). If the second part of the write thread's wait is fulfilled, the function clears the request, sends an informative signal to the write thread an then returns to the determine whether the write thread is currently working on the data step (box 730). If the wait is not a two-part wait (it must then be a one-part wait), if the first part of the write thread's wait is fulfilled, the function clears the request, sends an informative signal to the write thread, and then returns to the determine whether the write thread is currently working on the data step (box 732).

Write Thread

The write thread 512 contains two main functions, the "get next area" function 522 for managing allocated data and the "block copy" function 524 for coordinating location of the data (as shown in FIG. 5). The "get next area" function 522 contains one subfunction, the "area resume/allocated area" function 526. This subfunction manages the data if a resume marker is set or if the current area is allocated. A resume marker is a marker that the write thread sets to a point in the buffer. The point serves as a marker for restarting the parsing of data at that point at a later time. The resume marker prevents portions of the buffer from being cleared if that portion of the buffer is with the resume marker.

Figure 8:
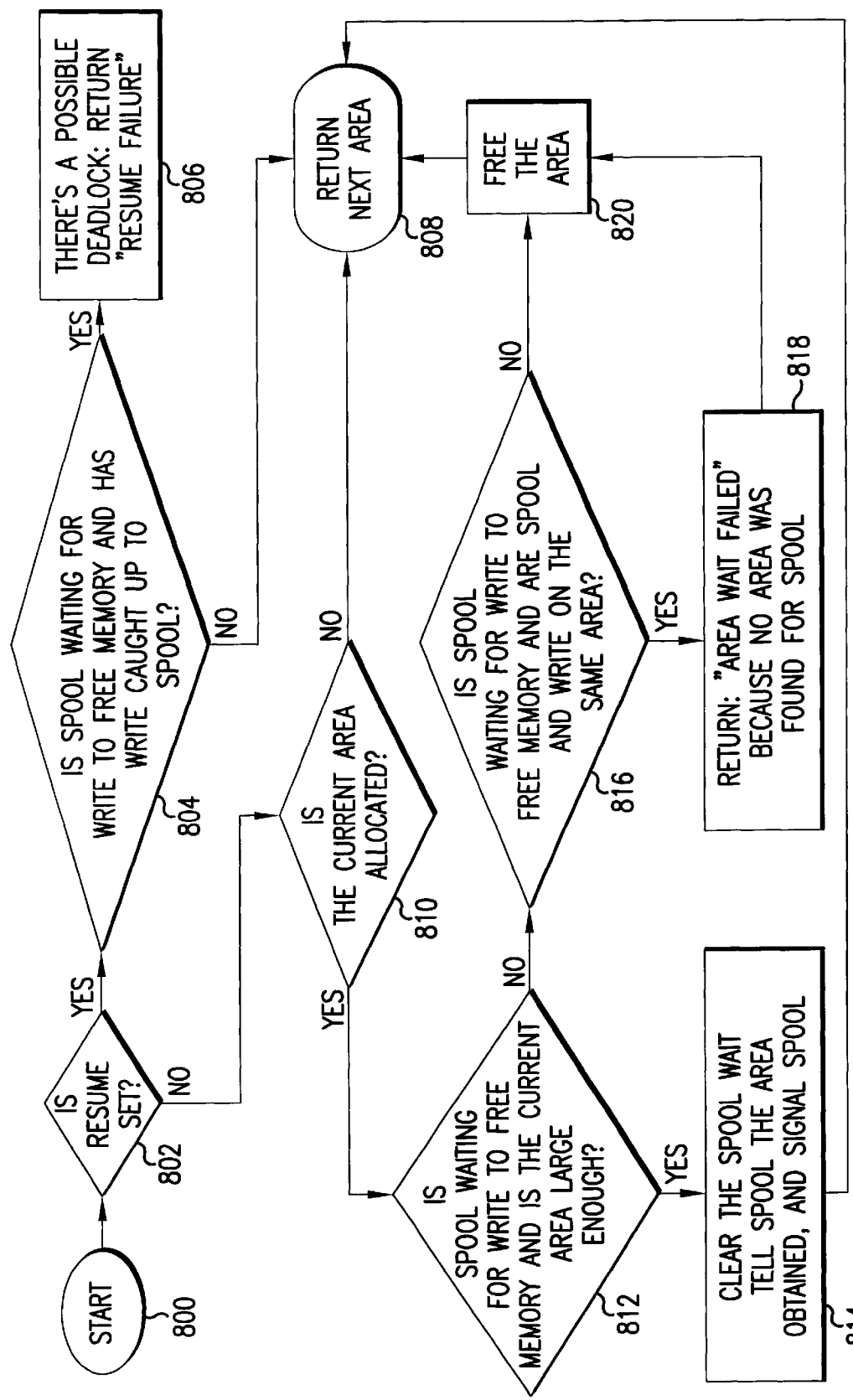
FIG. 8 is a detailed flow diagram of the operation of the "get next area" function of the buffering scheme of the present invention.

FIG. 8 is a detailed flow diagram of the operation of the "get next area" function of the buffering scheme 130 of FIGS. 1 and 2 of the present invention. The function starts (box 800) by first determining whether the resume marker is set (decision box 802). If the resume marker is set, it is determined whether the spooler thread is waiting for the write thread to free memory and if the write thread has caught up to spooler thread (decision box 804). If this is true, a possible deadlock may exist and a "resume failure" is returned (box 806). This will happen if there is not enough memory to fit the entire resume area. If the spooler thread is not waiting for the write thread to free memory and if the write thread has not caught up to spooler thread, the function returns to the next area (box 808). If the resume marker is not set, the function determines whether the current area is allocated (box 810). If the current area is not allocated, the function returns to the next area (box 808). If the current area is allocated, the function determines whether the spooler thread is waiting for the write thread to free memory and whether the current area is large enough (decision box 812). If this is true, a wait area is cleared, the spooler thread is informed of the area obtained, and an informative signal is sent to the spooler thread (box 814). If the spooler thread is not waiting for the write thread to free memory and the current area is not large enough, the function determines whether the spooler thread is waiting for the write thread to free memory and if the spooler thread and write thread are on the same area (decision box 816). If this is true and no area was found for the spooler thread, the function returns "area wait failed" and the area is freed (box 818). If the spooler thread is not waiting for the write thread to free memory, the area is freed (box 820). Last, the function returns to the next area.

Figure 9:
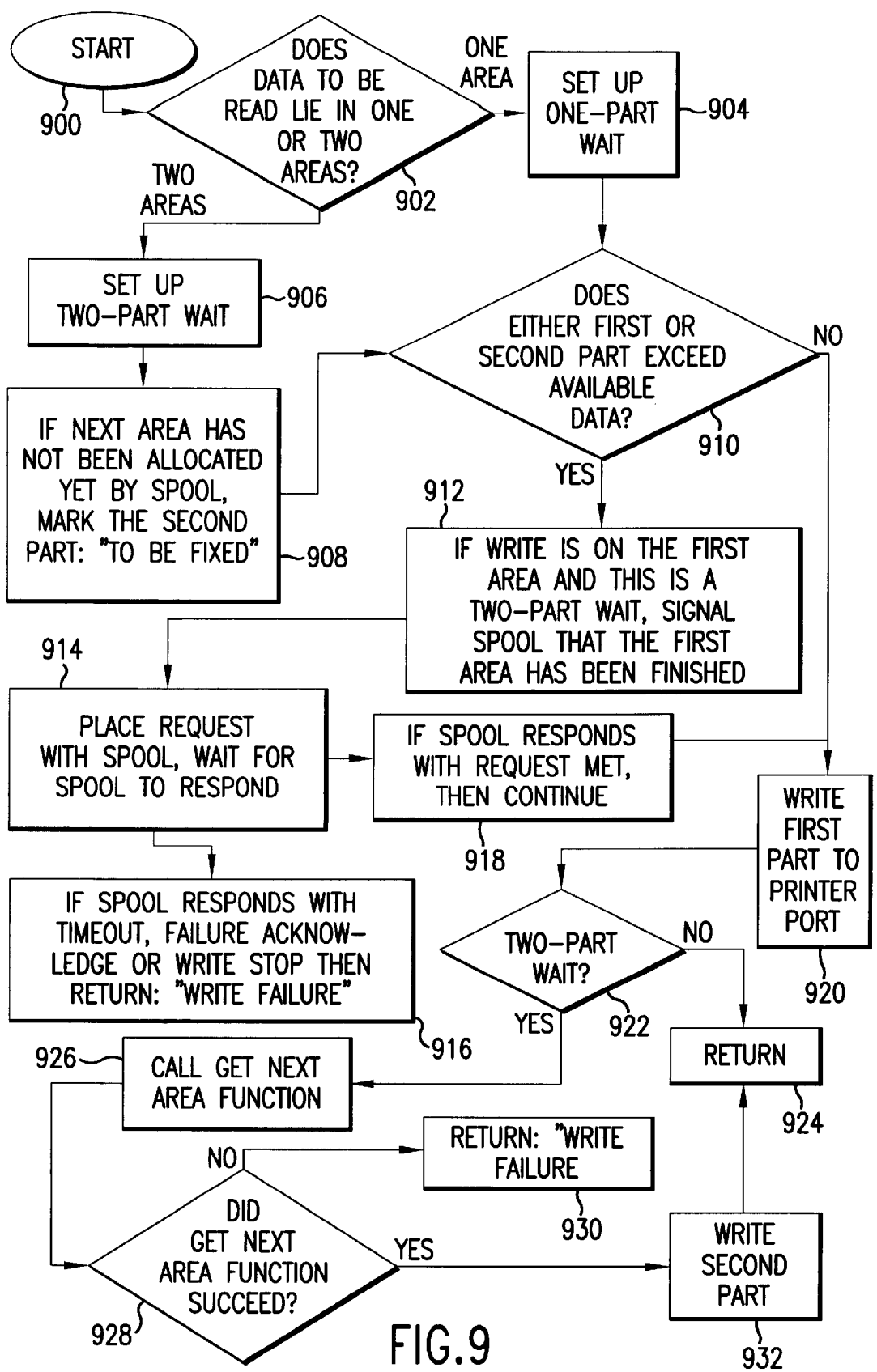
FIG. 9 is a detailed flow diagram of the operation of the "block copy" function of the buffering scheme of the present invention.

FIG. 9 is a detailed flow diagram of the operation of the "block copy" function of the buffering scheme 130 of FIGS. 1 and 2 of the present invention. The "block copy" function 524 contains one subfunction, the "determine type of area" function 528 for determining the type of area (either a one part area or a two part area) and then performing coordination and location of the data (as shown in FIG. 5). The function starts (box 900) by first determining whether the data to be read is a one part wait (data to be read lies only in one area) or two part wait (i.e., data to be read lies at the end of one area and at the beginning of the next area) (decision box 902). If the data is a one part wait, a one part wait is set up (box 904). If the data is a two part wait, a two part wait is set up (box 906). If the next area has not been allocated yet by the spooler thread, the second part of the wait is marked "to be fixed" (box 908). Next, the function determines whether either the first part or second part exceeds available data (data not yet placed by the spooler thread) (decision box 910). If the first part or second part exceeds available data and if the write thread is on the first area and this is a two-part wait, a signal is sent to the spooler thread that the first area has been finished (box 912). Next, a request is placed with the spooler thread and the write thread waits for the spooler thread to respond (box 914). If the spooler thread responds a timeout signal, the user is informed and the function returns "write failure" (box 916). If the spooler thread responds a failure acknowledge signal, the function returns "write failure" (box 916). If the spooler thread responds a write stop signal, the function returns "write failure" (box 916). If the spooler thread responds a request met signal, the function continues (box 918) and then writes the first part to the printer port (box 920). Also, if the first part or second part does not exceed available data, the write thread writes the first part to the printer port (box 920). Next, the function determines whether a two-part area exists (decision box 922). If a two-part area does not exist, the function returns a success signal (box 924). If a two-part area does exist, the "get next area" function is called (box 926). The function then determines whether the "get next area function" succeeded (decision box 928). If the "get next area function" did not succeed, the function returns "write failure" (box 930). If the "get next area function" did succeed, the second part is written (box 932). Last, a call is made to return a success signal 924.

Sample Operation of the Working Example

In this example, the buffering system 130 of FIGS. 1 and 2 is divided into a series of separate buffers of virtual memory (about one megabyte for each separate buffer). Also, data is being sent from the spooler to the language monitor at about four kilobyte arbitrary packets of data. The spooler thread receives the four kilobytes of data and places them in buffers. For instance, a single buffer may have one megabyte of allocation space, and several buffers can exist, depending on the memory available on the host computer.

If only four separate buffers exist, and three of the buffers are already allocated and full, then the fourth buffer is started. During starting of the fourth buffer, a check is made to see if the fourth buffer is full. If it is not full, but only partially full, then the rest of the buffer is filled. However, if the fourth buffer is full, then more virtual memory must be allocated. But, if more virtual memory cannot be allocated (no more buffers) then the threads have to share.

Sharing threads occurs when the spooler thread needs to allocate more memory, but it cannot. If more memory cannot be allocated, the spooler thread must wait. During this period, the write thread is running and processing data and sending it to the printer. When the write thread finishes the first buffer, it asks the spooler thread if it needs more memory to allocated data. If the spooler thread does need more data, the write thread gives it a pointer to the first buffer.

Otherwise, the write thread frees the first buffer as usable memory for the host computer. If the write thread gives the spooler thread the pointer to the first buffer, the spooler thread takes the pointer and moves the pointer from the first buffer to the fourth buffer. Then all the data for that buffer is reset (resets and initializes the buffer and starts the buffer over so that data can be written to that buffer). Thus, if there is only enough memory for a limited amount of buffers, the buffering scheme 130 of FIGS. 1 and 2 and multithreading system of the present invention continually reuses the available buffers as it progresses.

Proper communication between the spooler thread and the write thread is critical (i.e., the spooler thread has data and needs memory, and informs the write thread to get more memory when it can). Also, depending on the print job, the write thread may operate faster than the spooler thread. In this situation, the write thread will run out data and will have to wait for the spooler thread to get more data from the spooler. When the spooler thread gets more data, the spooler thread signals the write thread to take that additional data and process it.

Conclusions

The universal multithreading system and software-driven buffering scheme 130 of FIGS. 1 and 2 of the print system of the present invention can efficiently handle print jobs and is easily adaptable to many printers. The continuous data generation and transfer and the simultaneous activity of the software and hardware components not only alleviates waitbanding, but also greatly increases throughput of the printer. This enables the print system to perform larger and more complex print jobs without problems. Further, since the print system of present invention contains software-driven adaptability, it is inexpensive. Therefore, the present invention has practical applications in the printer and computer field and extraordinary real world value in the highly competitive computer/printer market.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A print system for printing digital data on a printer, said print system comprising:
   a printer monitoring device coupled to the printer for translating the digital data into printer readable data and for providing communication with the printer;
   a status monitoring device coupled to the printer and said printer monitoring device for monitoring status information of the printer;
   a first executable thread for continuously retrieving and storing portions of the digital data;
   a second executable thread, operating simultaneously with the first thread for continuously processing said stored portions of the digital data and for continuously sending said processed portions of the digital data to the printer via said printer monitoring device; and
   a third executable thread for transferring status data from said printer monitoring device to said status monitoring device;
   wherein the continuous and simultaneous activity of the threads reduces band waiting and enables immediate printing of printer readable data without waiting for an entire page of printer data to be generated.

2. The print system as set forth in claim 1, further comprising an input/output stack coupled between said printer monitoring device and the printer for implementing a stack of communication protocols for proper printer communication.

3. The print system as set forth in claim 1, further comprising a printer spooler device coupled to said printer monitoring device for generating the digital data and for allowing said first executable device to retrieve the digital data.

4. The print system as set forth in claim 1, wherein the printer is a bi-directional printer for providing two way communication between said printer monitoring device and the printer.

5. The print system as set forth in claim 1, further comprising a digital storage device for temporarily storing the digital data.

6. A host computer language monitor, comprising:
   a host computer language monitor thread for retrieving in seriatim individual image data indicative of an image to be printed, and for allocating them to a memory location in a host computer;
   another host computer language monitor thread for retrieving in seriatim the individual image data stored in said memory and for translating them into printer readable data; and
   said another host computer language monitor thread further for sending the printer data in seriatim to a printer said printer readable data;
   wherein said host computer language monitor thread and said another host computer language monitor thread operate simultaneously and continuously until all of the individual arbitrary packet size data have been translated and sent to the printer for printing said image.

7. A print system including a host computer language monitor for providing two way communications between a host computer and a printer, said print system, comprising:
   a host computer language monitor thread for retrieving in seriatim individual arbitrary packet size data indicative of a image to be printed, and for allocating them to a virtual memory location in said host computer;
   another host computer language monitor thread for retrieving in seriatim the individual arbitrary packet size data stored in said virtual memory and for translating them into printer readable data; and
   said another host computer language monitor thread further for sending in seriatim to the printer said printer readable data;
   wherein said host computer language monitor thread and said another host computer language monitor thread operate simultaneously and continuously until all of the individual arbitrary packet size data have been translated and sent to the printer for printing said image.

8. The invention as set forth in claim 1, wherein:
   the digital data resides on a computer readable medium;
   said first executable device is coupled between said computer readable medium and said printer monitoring device;
   said stored portions of the digital data are stored on a storage device; and
   said second executable device is coupled between said storage device and said printer monitoring device.

9. A method for printing digital data on a printer, said method comprising the steps of:
   (a) continuously retrieving and storing portions of the digital data;
   (b) continuously processing and translating said stored portions of the digital data into printer readable data by the printer;
   (c) continuously sending said processed and translated data to the printer;
   (d) continuously monitoring status information of the printer; and
   (e) wherein steps (a)–(d) operate simultaneously for reducing band waiting and enabling immediate printing of printer readable data without waiting for an entire page of printer data to be generated.

10. The print method as set forth in claim 9, further comprising the step of implementing a stack of communication protocols for proper printer communication.

11. The print method as set forth in claim 9, further comprising, before step (a), the step of generating the digital data.

12. The print method as set forth in claim 9, further comprising the step of providing bi-directional communication with the printer.

13. The print method as set forth in claim 9, further comprising the step of transferring status data to a user.

14. A print system for printing digital data on a printer, comprising:
   a computer coupled to the printer and having a digitally readable medium, wherein the digital data resides on said digitally readable medium;
   an operating system residing on said digitally readable medium for operating applications and controlling functions of said computer;
   a status monitor running on said operating system for monitoring status information of the printer and providing status information to a user;
   a language monitor running on said operating system for translating the digital data into printer readable data by the printer and for providing communication with the printer; and
   wherein said language monitor is preprogrammed to execute a first thread for continuously retrieving and storing portions of the digital data and to simultaneously execute a second thread for continuously processing portions of said stored digital data and for continuously sending said processed portions of the digital data to the printer, and further preprogrammed to execute a third thread for transferring status data from said language monitor to said status monitor.

15. The print system as set forth in claim 14, further comprising an input/output layer coupled between said language monitor and the printer for implementing a stack of communication protocols for proper printer communication.

16. The print system as set forth in claim 14, further comprising a printer spooler running on said operating system for generating the digital data and for allowing said first thread to retrieve the digital data.

17. The print system as set forth in claim 14, wherein the printer is a bi-directional printer for providing two-way communication between said language monitor and the printer.

18. The print system as set forth in claim 14, further comprising an allocated digital storage area of said digitally readable medium for temporarily storing the digital data.

19. The print system as set forth in claim 14, further comprising a random access digital storage area for temporarily storing portions of the digital data.

20. A print system, comprising:
   a host computer language monitor for providing two way communication between a host computer and a printer;
   a host computer spooler for generating in seriatim arbitrary packet size data indicative of individual portions of a monitor image;
   a host computer language monitor thread for retrieving in seriatim the individual arbitrary packet size data, and for allocating them to a virtual memory location in said host computer;
   said host computer language monitor thread further for notifying said host computer spooler that said host computer language monitor is ready to receive another individual arbitrary packet size data;
   another host computer language monitor thread for retrieving in seriatim the individual arbitrary packet size data, and for translating them into printer readable data; and
   said another host computer language monitor thread further for sending in seriatim to said printer, said printer readable data;
   wherein after said host computer language monitor thread notifies said host computer spooler that said host computer language monitor is ready to receive another individual arbitrary packet size data, said host computer language monitor thread and said another host computer language monitor thread operate simultaneously and continuously until all of the individual arbitrary packet size data have been translated and sent to said printer for printing said monitor image.

21. A method of printing, comprising:
   retrieving in seriatim individual arbitrary packet size data indicative of an image to be printed, wherein packet is allocated to a memory location in a host computer;
   translating in seriatim the individual packets into printer readable data;
   sending the printer data in seriatim to a printer said printer readable data; and
   wherein said steps of retrieving, translating and sending operate simultaneously and continuously to reduce band waiting and until all of the individual arbitrary packet size data have been translated and sent to the printer for printing said image.

22. A computer-readable medium for causing a computer to function as a print system, comprising:
   a computer-readable storage medium;
   a computer program stored on said medium;
   said computer program having a language monitor for translating generated digital data into printer readable data by a printer and for providing communication with said printer;
   said computer program also having a status monitor for monitoring status information of said printer and providing said status information to a user;
   wherein said language monitor is preprogrammed to execute a first thread for continuously retrieving and storing portions of said generated digital data on the computer-readable storage medium and to simultaneously execute a second thread for continuously processing portions of said stored digital data and for continuously sending said processed portions of said digital data to said printer, and said language monitor is further preprogrammed to execute a third thread for transferring status data from said language monitor to said status monitor;
   wherein said computer program stored on the computer-readable storage medium functions to cause the computer to function as a print system for printing said digital data.

23. The print system as set forth in claim 22, further comprising an input/output layer coupled between said language monitor and said printer for implementing a stack of communication protocols for proper printer communication.

24. The print system as set forth in claim 22, further comprising a printer spooler for generating said digital data and for allowing said first thread to retrieve said digital data.

25. The print system as set forth in claim 22, wherein said printer is a bi-directional printer for providing two way communication between said language monitor and said printer.

26. The print system as set forth in claim 22, further comprising a random access digital storage area for temporarily storing portions of said digital data.

27. The print system as set forth in claim 22, wherein said first thread is a spooler thread and said second thread is a write thread;

said spooler thread comprises an allocate execution for allocating portions of said computer-readable storage medium as virtual memory for said digital data and a concat execution for coordinating access and storage of said digital data; and said write thread comprises a retrieve execution for managing said allocated data and a copy execution for coordinating locational storage and retrieval of said digital data.

28. The print system as set forth in claim 27, further comprising a resume marker set by said write thread to a point in said allocated portion serving as a marker for restarting the processing of said digital data at that point at a later time by said write thread for preventing allocated portions within said resume marker from being cleared.

29. The print system as set forth in claim 28, wherein said concat execution comprises a data space subexecution for managing said allocation of said digital data when allocation portions are exceeded and for coordinating said digital data when said write thread is waiting for said spooler thread to perform its executions and wherein said retrieve execution comprises a resume subexecution for managing said digital data if said resume marker is set.

30. A computer-implemented process for printing digital data residing on a readable medium of a source computer to a printer, comprising the steps of:

(a) initially retrieving and storing a first portion of the digital data;

(b) retrieving and storing remainder portions of the digital data;

(c) processing and translating said stored portions of the digital data into printer readable data by the printer;

(d) sending the processed and translated data to the printer;

(e) monitoring status information of the printer; and (f) performing steps (b)–(e) simultaneously and continuously so that the digital data is printed on the printer without printing pauses thereby maximizing printing throughput.

31. The print system as set forth in claim 30, further comprising the step of implementing a stack of communication protocols for proper printer communication.

32. The print system as set forth in claim 30, further comprising, before step (a), the step of generating the digital data.

33. The print system as set forth in claim 30, further comprising the step of providing bi-directional two-way communication with the printer.

34. The print system as set forth in claim 30, further comprising the step of transferring status data to a user.

* * * * *